(12) United States Patent
Wang et al.

(10) Patent No.: US 8,743,947 B2
(45) Date of Patent: Jun. 3, 2014

(54) METHOD AND APPARATUS FOR DETERMINING PRECODING MATRIX, WIRELESS COMMUNICATION SYSTEM

(71) Applicant: Fujitsu Limited, Kawasaki (JP)

(72) Inventors: Yi Wang, Beijing (CN); Yi Zhang, Beijing (CN); Yuantao Zhang, Beijing (CN); Hua Zhou, Beijing (CN); Jianming Wu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/788,948

(22) Filed: Mar. 7, 2013

(65) Prior Publication Data

US 2013/0188750 A1    Jul. 25, 2013

Related U.S. Application Data

(63) Continuation of application No. PCT/CN2010/077355, filed on Sep. 27, 2010.

(51) Int. Cl.
*H03K 7/04* (2006.01)
*H04K 1/10* (2006.01)
*H04J 1/00* (2006.01)

(52) U.S. Cl.
USPC .......................... 375/239; 375/260; 370/343

(58) Field of Classification Search
USPC .................................. 375/239, 260; 370/343
See application file for complete search history.

(56) References Cited

U.S. PATENT DOCUMENTS

| 6,717,996 | B1* | 4/2004 | Du Reau et al. | 375/343 |
| 2006/0276212 | A1* | 12/2006 | Sampath et al. | 455/513 |
| 2007/0071147 | A1* | 3/2007 | Sampath et al. | 375/347 |
| 2007/0183371 | A1* | 8/2007 | McCoy | 370/334 |
| 2008/0043867 | A1* | 2/2008 | Blanz et al. | 375/260 |
| 2009/0080549 | A1* | 3/2009 | Khan et al. | 375/260 |
| 2009/0122857 | A1* | 5/2009 | Li et al. | 375/239 |

(Continued)

FOREIGN PATENT DOCUMENTS

| CN | 101617487 | 12/2009 |
| CN | 101677265 | 3/2010 |

(Continued)

OTHER PUBLICATIONS

International Search Report issued for corresponding International Patent Application No. PCT/CN2010/077355, mailed Jun. 30, 2011 with an English translation.

*Primary Examiner* — Leon-Viet Nguyen
*Assistant Examiner* — Sarah Hassan
(74) *Attorney, Agent, or Firm* — Myers Wolin, LLC

(57) ABSTRACT

A method and apparatus for determining a precoding matrix and a wireless communication system. In data retransmission, when the retransmission rank is less than an initial transmission rank, the transmitting end selects a matrix having a maximum similarity with an initial transmission precoding matrix in spatial direction according to the retransmission rank. In multiple data retransmissions, precoding matrixes for the retransmissions are different from each other and may have a minimum similarity in the spatial direction, but have a maximum similarity with the initial transmission precoding matrix in the spatial direction. Or, the similarity between each retransmission precoding matrix and the initial transmission precoding matrix in the spatial direction progressively decreases. When precoding matrixes (or identity matrixes) are required for the initial transmission, precoding matrixes having the minimum similarity with each other in the spatial direction are selected according to the retransmission rank, and then orderly used in multiple retransmissions.

23 Claims, 10 Drawing Sheets

(56) References Cited

U.S. PATENT DOCUMENTS

2010/0131813 A1    5/2010  Kim et al.
2010/0238984 A1*   9/2010  Sayana et al. ................. 375/219
2011/0149942 A1*   6/2011  Ko et al. ....................... 370/343

FOREIGN PATENT DOCUMENTS

| CN | 101860424   | 10/2010 |
| WO | 2010/015640 | 2/2010  |
| WO | 2010/024645 | 3/2010  |

* cited by examiner

METHOD AND APPARATUS FOR DETERMINING PRECODING MATRIX, WIRELESS COMMUNICATION SYSTEM

CROSS-REFERENCE TO RELATED APPLICATIONS

The present application is a continuation of PCT Application No. PCT/CN2010/077355, filed on Sep. 27, 2010, the contents of which are herein wholly incorporated by reference.

FIELD OF THE INVENTION

The present invention relates to a transmission technology in a wireless communication system, and particularly, to a method and an apparatus for determining precoding matrix for data retransmission, and a wireless communication system using the method and the apparatus.

BACKGROUND OF THE INVENTION

In order to improve the reliability of the correct decoding of a wrong data block, the wireless communication system usually employs the Hybrid Automatic Repeat Request (HARQ) technology. The HARQ is realized by combining the Automatic Repeat Request (ARQ) and the Forward Error Correction (FEC). At the receiving end, it is firstly judged whether the data block is correctly received through a Cyclic Redundancy Check (CRC); and if an error occurs, the ARQ will be sent to request a data retransmission. Such HARQ technology is employed in the LTE and LTE-Advanced uplink system. The base station (NB or eNB) detects the CRC, and sends a repeat request to the user equipment when an error is found. Then the user equipment retransmits the data block to the base station after receiving the request.

In the LTE-Advanced (LTE-A) system, in order to improve the uplink peek rate, a Multiple Input Multiple Output (MIMO) technology is introduced. The user equipment may be provided with up to four transmitting antennas. The precoding technology is a branch of the MIMO technology, i.e., each data stream is simultaneously transmitted in respective transmitting antennas after being multiplied by the precoding matrix. In the LTE-Advanced system, the precoding matrix for initial transmission (herein also referred to as initial transmission precoding matrix) has been determined, as shown in Tables 1 to 4. The rank is the number of the data streams, e.g., when there are 3 data streams, the rank is 3. Herein the number of data streams for initial transmission is referred to as the rank for initial transmission (initial transmission rank), and the number of data streams for retransmission is referred to as the rank for retransmission (retransmission rank).

Since the channel fadings experienced by the data streams are not completely the same, in the initial transmission, there may be a condition that the data corresponding to some data streams are correctly received, while the data corresponding to other data streams are wrongly received. In order to improve the transmission efficiency, only the wrong data streams are retransmitted, and the retransmission rank may be less than the initial transmission rank. The minimum unit of the retransmission is the transmission block (TB). FIG. 1 illustrates a mapping relationship between TBs and data streams. As illustrated in FIG. 1(a), two transmission blocks are transmitted in two layers (Layer 1 and Layer 2) respectively. If there is only one TB not successfully decoded, (NACK, ACK) or (ACK, NACK) will be returned to the data sender. This only needs to transmit the TB under NACK, i.e., retransmission rank (1) is different from (lower than) retransmission rank (2). Similarly, as illustrated in FIG. 1(b), the first TB of the two TBs is transmitted in Layer 1, and the second TB is transmitted in Layers 2 and 3. If there is only one TB not successfully decoded, (NACK, ACK) or (ACK, NACK) will be returned to the data sender. This only needs to transmit the TB under NACK, i.e., the first TB is retransmitted with a retransmission rank of 1 when (NACK, ACK) is received, the second TB is retransmitted with a retransmission rank of 2 when (ACK, NACK) is received, while the retransmission ranks are both different from (lower than) the initial transmission rank (3). As illustrated in FIG. 1(c), the first TB of the two TBs is transmitted in Layers 1 and 2, and the second TB is transmitted in Layers 3 and 4. If there is only one TB not successfully decoded, (NACK, ACK) or (ACK, NACK) will be returned to the data sender. This only needs to transmit the TB under NACK, i.e., the first TB is retransmitted with a retransmission rank of 2 when (NACK, ACK) is received, the second TB is retransmitted with a retransmission rank also of 2 when (ACK, NACK) is received, while the retransmission ranks are both different from (lower than) the initial transmission rank (4).

How to select the precoding matrix during the retransmission is a problem urgently to be solved. In the conventional art, the precoding matrix for retransmission (herein also referred to as retransmission precoding matrix) is obtained by performing a certain algorithm on the precoding matrix for initial transmission. For example, international patent publication No. WO2010/024645 discloses that a precoding matrix for retransmission is generated by multiplexing a precoding matrix for initial transmission with a unary matrix, and international patent publication No. WO2010/015640 discloses that a precoding matrix for retransmission is generated using time correction channels.

During the study of embodiments herein, the inventor finds that in the above technical solutions of the conventional art, the condition that the retransmission rank and the initial transmission rank are different from each other is not considered. In addition, a precoding matrix different from those included in the existing code book shall be generated, which requires more memory spaces of the sender and the receiver.

To be noted, the above introduction to the background art is just made for the convenience of clearly and completely describing the technical solution of the present invention, and to facilitate the understanding of a person skilled in the art. It shall not be deemed that those technical solutions are well known to a person skilled in the art just because they are described the Background section of the present invention.

TABLE 1

Precoding Matrix with the Rank of 1

Code book

Indexes 0-7:

$$\frac{1}{2}\begin{bmatrix} 1 \\ 1 \\ 1 \\ -1 \end{bmatrix} \quad \frac{1}{2}\begin{bmatrix} 1 \\ 1 \\ j \\ j \end{bmatrix} \quad \frac{1}{2}\begin{bmatrix} 1 \\ 1 \\ -1 \\ 1 \end{bmatrix} \quad \frac{1}{2}\begin{bmatrix} 1 \\ 1 \\ -j \\ -j \end{bmatrix}$$

$$\frac{1}{2}\begin{bmatrix} 1 \\ j \\ 1 \\ j \end{bmatrix} \quad \frac{1}{2}\begin{bmatrix} 1 \\ j \\ j \\ 1 \end{bmatrix} \quad \frac{1}{2}\begin{bmatrix} 1 \\ j \\ -1 \\ -j \end{bmatrix} \quad \frac{1}{2}\begin{bmatrix} 1 \\ j \\ -j \\ -1 \end{bmatrix}$$

Indexes 8-15:

$$\frac{1}{2}\begin{bmatrix} 1 \\ -1 \\ 1 \\ 1 \end{bmatrix} \quad \frac{1}{2}\begin{bmatrix} 1 \\ -1 \\ j \\ -j \end{bmatrix} \quad \frac{1}{2}\begin{bmatrix} 1 \\ -1 \\ -1 \\ -1 \end{bmatrix} \quad \frac{1}{2}\begin{bmatrix} 1 \\ -1 \\ -j \\ j \end{bmatrix}$$

$$\frac{1}{2}\begin{bmatrix} 1 \\ -j \\ 1 \\ -j \end{bmatrix} \quad \frac{1}{2}\begin{bmatrix} 1 \\ -j \\ j \\ -1 \end{bmatrix} \quad \frac{1}{2}\begin{bmatrix} 1 \\ -j \\ -1 \\ j \end{bmatrix} \quad \frac{1}{2}\begin{bmatrix} 1 \\ -j \\ -j \\ 1 \end{bmatrix}$$

Indexes 16-23:

$$\frac{1}{2}\begin{bmatrix} 1 \\ 0 \\ 1 \\ 0 \end{bmatrix} \quad \frac{1}{2}\begin{bmatrix} 1 \\ 0 \\ -1 \\ 0 \end{bmatrix} \quad \frac{1}{2}\begin{bmatrix} 1 \\ 0 \\ j \\ 0 \end{bmatrix} \quad \frac{1}{2}\begin{bmatrix} 1 \\ 0 \\ -j \\ 0 \end{bmatrix}$$

$$\frac{1}{2}\begin{bmatrix} 0 \\ 1 \\ 0 \\ 1 \end{bmatrix} \quad \frac{1}{2}\begin{bmatrix} 0 \\ 1 \\ 0 \\ -1 \end{bmatrix} \quad \frac{1}{2}\begin{bmatrix} 0 \\ 1 \\ 0 \\ j \end{bmatrix} \quad \frac{1}{2}\begin{bmatrix} 0 \\ 1 \\ 0 \\ -j \end{bmatrix}$$

TABLE 2

Precoding Matrix with the Rank of 2

Code book

Indexes 0-7:

$$\frac{1}{2}\begin{bmatrix} 1 & 0 \\ 1 & 0 \\ 0 & 1 \\ 0 & -j \end{bmatrix} \quad \frac{1}{2}\begin{bmatrix} 1 & 0 \\ 1 & 0 \\ 0 & 1 \\ 0 & j \end{bmatrix} \quad \frac{1}{2}\begin{bmatrix} 1 & 0 \\ -j & 0 \\ 0 & 1 \\ 0 & 1 \end{bmatrix} \quad \frac{1}{2}\begin{bmatrix} 1 & 0 \\ -j & 0 \\ 0 & 1 \\ 0 & -1 \end{bmatrix}$$

$$\frac{1}{2}\begin{bmatrix} 1 & 0 \\ -1 & 0 \\ 0 & 1 \\ 0 & -j \end{bmatrix} \quad \frac{1}{2}\begin{bmatrix} 1 & 0 \\ -1 & 0 \\ 0 & 1 \\ 0 & j \end{bmatrix} \quad \frac{1}{2}\begin{bmatrix} 1 & 0 \\ j & 0 \\ 0 & 1 \\ 0 & 1 \end{bmatrix} \quad \frac{1}{2}\begin{bmatrix} 1 & 0 \\ j & 0 \\ 0 & 1 \\ 0 & -1 \end{bmatrix}$$

Indexes 8-15:

$$\frac{1}{2}\begin{bmatrix} 1 & 0 \\ 0 & 1 \\ 1 & 0 \\ 0 & 1 \end{bmatrix} \quad \frac{1}{2}\begin{bmatrix} 1 & 0 \\ 0 & 1 \\ 1 & 0 \\ 0 & -1 \end{bmatrix} \quad \frac{1}{2}\begin{bmatrix} 1 & 0 \\ 0 & 1 \\ -1 & 0 \\ 0 & 1 \end{bmatrix} \quad \frac{1}{2}\begin{bmatrix} 1 & 0 \\ 0 & 1 \\ -1 & 0 \\ 0 & -1 \end{bmatrix}$$

$$\frac{1}{2}\begin{bmatrix} 1 & 0 \\ 0 & 1 \\ 0 & 1 \\ 1 & 0 \end{bmatrix} \quad \frac{1}{2}\begin{bmatrix} 1 & 0 \\ 0 & 1 \\ 0 & -1 \\ 1 & 0 \end{bmatrix} \quad \frac{1}{2}\begin{bmatrix} 1 & 0 \\ 0 & 1 \\ 0 & 1 \\ -1 & 0 \end{bmatrix} \quad \frac{1}{2}\begin{bmatrix} 1 & 0 \\ 0 & 1 \\ 0 & -1 \\ -1 & 0 \end{bmatrix}$$

TABLE 3

Precoding Matrix with the Rank 3

| Indexes | | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

*: Indexes

TABLE 4

Precoding Matrix with the Rank of 4

| | Code book |
|---|---|
| Index 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

SUMMARY OF THE INVENTION

The object of certain embodiments herein is to provide a method and an apparatus for determining a precoding matrix for data retransmission, so as to overcome one or more disadvantages caused by the limitations of the prior art, and provide at least one beneficial choice.

According to one aspect of the present invention, an electronic apparatus is provided, comprising: an initial transmission rank determining unit for determining an initial transmission rank; an initial transmission precoding matrix determining unit for determining an initial transmission precoding matrix used in the transmission of an initial transmission content; a response receiving unit for receiving a confirmation for the initial transmission content from a communication counterparty that communicates with the electronic apparatus; a retransmission rank determining unit for determining whether a retransmission is necessary according to the confirmation, and determining a retransmission rank when it is determined that the retransmission is necessary; and a retransmission precoding matrix determining unit for determining a retransmission precoding matrix according to the initial transmission precoding matrix determined by the initial transmission precoding matrix determining unit and the retransmission rank, when the retransmission rank is less than the initial transmission rank.

According to another aspect of the present invention, an electronic apparatus is provided, comprising: an initial transmission rank determining unit for determining an initial transmission rank; an initial transmission precoding matrix determining unit for determining an initial transmission precoding matrix used in the transmission of an initial transmission content by a communication counterparty that communicates with the electronic apparatus; a decoding unit for decoding data received from the communication counterparty; a retransmission rank determining unit for determining whether a retransmission by the communication counterparty is necessary according to a decoding result of the decoding unit, and determining a retransmission rank when it is determined that the retransmission by the communication counterparty is necessary; a retransmission precoding matrix determining unit for determining the retransmission precoding matrix according to the initial transmission precoding matrix determined by the initial transmission precoding matrix determining unit and the retransmission rank, when the retransmission rank is less than the initial transmission rank.

According to still another aspect of the present invention, a communication system is provided, comprising: a first electronic apparatus, which is an electronic apparatus according to the one aspect; a second electronic apparatus, which is an electronic apparatus according to the another aspect; wherein the retransmission precoding matrix determining units of the first electronic apparatus and the second electronic apparatus use the same method to determine the retransmission precoding matrix.

According to yet another aspect of the present invention, a method for determining a retransmission precoding matrix, comprising: determining an initial transmission rank; determining an initial transmission precoding matrix used in the transmission of an initial transmission content; receiving a confirmation for the initial transmission content from a communication counterparty; determining whether a retransmission is necessary according to the confirmation for the initial transmission content, and determining a retransmission rank when it is determined that the retransmission is necessary; and determining a retransmission precoding matrix according to the initial transmission precoding matrix and the retransmission rank, when the retransmission rank is less than the initial transmission rank.

According to further another aspect of the present invention, a method for determining a retransmission precoding matrix, comprising: determining an initial transmission rank; determining an initial transmission precoding matrix used in the transmission of an initial transmission content by a communication counterparty; decoding data received from the communication counterparty; determining whether a retransmission by the communication counterparty is necessary according to a decoding result, and determining a retransmission rank when it is determined that the retransmission by the communication counterparty is necessary; and determining the retransmission precoding matrix according to the initial transmission precoding matrix and the retransmission rank, when the retransmission rank is less than the initial transmission rank.

In addition, the present invention provides a computer program, which when being executed by a logic part such as computer, microprocessor or microcontroller, enables the logic part to execute the above generally described and the following specifically described method, or enables the logic part to realize the functions of the above generally described and the following specifically described receiver or transmitter or a part of the functions thereof.

Further, the present invention also provides a tangible machine readable storage medium for storing the above computer program.

The features described and/or illustrated with respect to one embodiment may be used in one or more other embodiments in the same or similar way, combined with the features in other embodiments, or replace the features in other embodiments.

To be emphasized, the terms "comprise/comprising", "have/has/having" and "include/including" herein are used to specify the presence of features, elements, steps or components, but they do not preclude the presence or addition of one or more other features, elements, steps, components or combinations thereof.

BRIEF DESCRIPTION OF THE DRAWINGS

The above and other objects, features and advantages of the present invention will be more apparent from the following detailed descriptions made with reference to the drawings, in which.

DETAILED DESCRIPTION OF THE PREFERRED EMBODIMENTS

The above and other features of the present invention will be apparent through the following descriptions with reference to the drawings. The Description and the drawings specifically disclose the specific embodiments of the present invention, which are some of the embodiments where the principle of the present invention can be employed. However, it shall be appreciated that the present invention is not limited to the described embodiments. On the contrary, the present invention includes all changes, modifications and equivalents falling within the scope of the accompanied claims.

Figure 1:
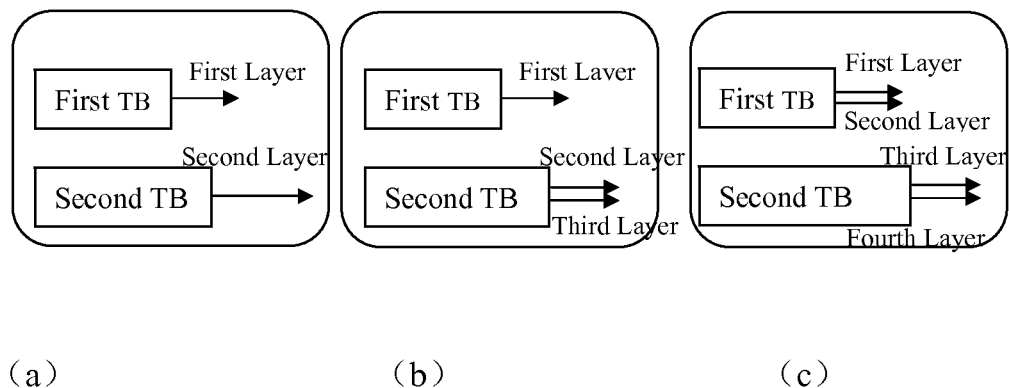
FIG. 1 illustrates a mapping relationship between TBs and data streams.
Figure 2:
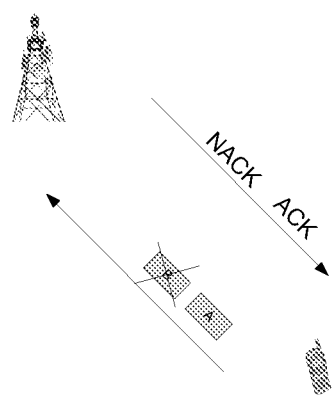
FIG. 2 schematically illustrates a wireless communication system that can be used as an embodiment for implementing the present invention.

FIG. 2 schematically illustrates an example of a wireless communication system that can be used as an embodiment for implementing the present invention. As illustrated in FIG. 2, the user equipment (UE) transmits data to a base station. The base station sends to the UE a reception feedback with respect to the data transmitted from the UE. In FIG. 2, the UE transmits two TBs A and B to the base station, wherein TB B is not correctly received, and the base station sends a reception feedback "ACK, NACK" to the UE. In that case, the UE needs to perform a retransmission. In the embodiment of the present invention, only TB B is retransmitted. The system as illustrated in FIG. 2 for example is an LTE-A system using the MIMO technology.

FIG. 2 is a schematic diagram rather than a limitation to the present invention. For example, more mobile terminals and more base stations may be available, and the system may be other communication system using the MIMO technology.

The present invention is described through an example in which a mobile phone is used as an electronic apparatus for transmitting data and receiving a feedback with respect to the transmitted data. It shall be appreciated that the electronic apparatus of the present invention is not limited to the mobile phone, and it may be any type of appropriate electronic apparatus, including all apparatuses which transmit data and receive feedback with respect to the transmitted data, such as media player, game device, desktop or laptop computer, pager, communicator, Personal Digital Assistant (PDA) and smart phone. Although in the embodiments of the present invention, the electronic apparatus (e.g., mobile phone) only transmits data and receives feedback with respect to the transmitted data, a person skilled in the art obviously knows that it can also receive data and make a reception feedback. The electronic apparatus (e.g., mobile phone) may have various functions known to a person skilled in the art, such as making conversation and sending message (e.g., SMS or MMS).

Figure 3:
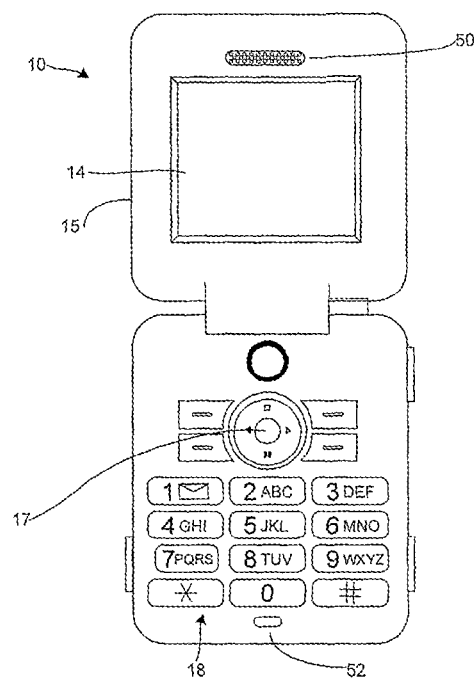
FIG. 3 is a schematic diagram of a mobile phone used as an electronic apparatus according to an embodiment of the present invention.

FIG. 3 is a schematic diagram of a mobile phone used as an electronic apparatus according to an embodiment of the present invention. As illustrated in FIG. 3, the mobile phone 10 may be a flip phone having a cover 15 movable between an open position and a closed position. In FIG. 3, the cover 15 is located in the open position. It shall be appreciated that the mobile phone 10 may have other structures, such as "bar phone" and "slide phone".

The mobile phone 10 may include a display 14 that displays information such as operation state, time, telephone number, telephone directory and menus to the user, so that the user can utilize various features of the electronic apparatus 10. The display 14 may be further configured to visually display the content received by the electronic apparatus 10 and/or retrieved from a memory (not illustrated) of the mobile phone 10. The display 14 may be configured to present images, videos and other graphics (e.g., photos, mobile TV programs and game-related videos) to the user.

A keypad 18 provides multiple user input operations. For example, the keypad 18 may include alphanumeric keys that allow alphanumeric information (e.g., telephone number, telephone list, telephone directory, notepad, text, etc.) to be input. In addition, the keypad 18 may include specific function keys 17, such as a "call sending" key for starting or answering a phone, and a "call ending" key for ending a phone or "hanging up". The specific function keys may further include menu navigation key and selection key which conveniently perform navigation through menus displayed on the display 14. For example, a pointing device and/or a navigation key may be provided to receive a directional input from the user. In addition, the display 14 and the keypad 18 may be used in combination to realize the soft key function. The mobile phone 10 further includes parts essential for realizing its functions, such as an antenna, a microcontroller, a speaker 50 and a microphone 52.

Figure 4:
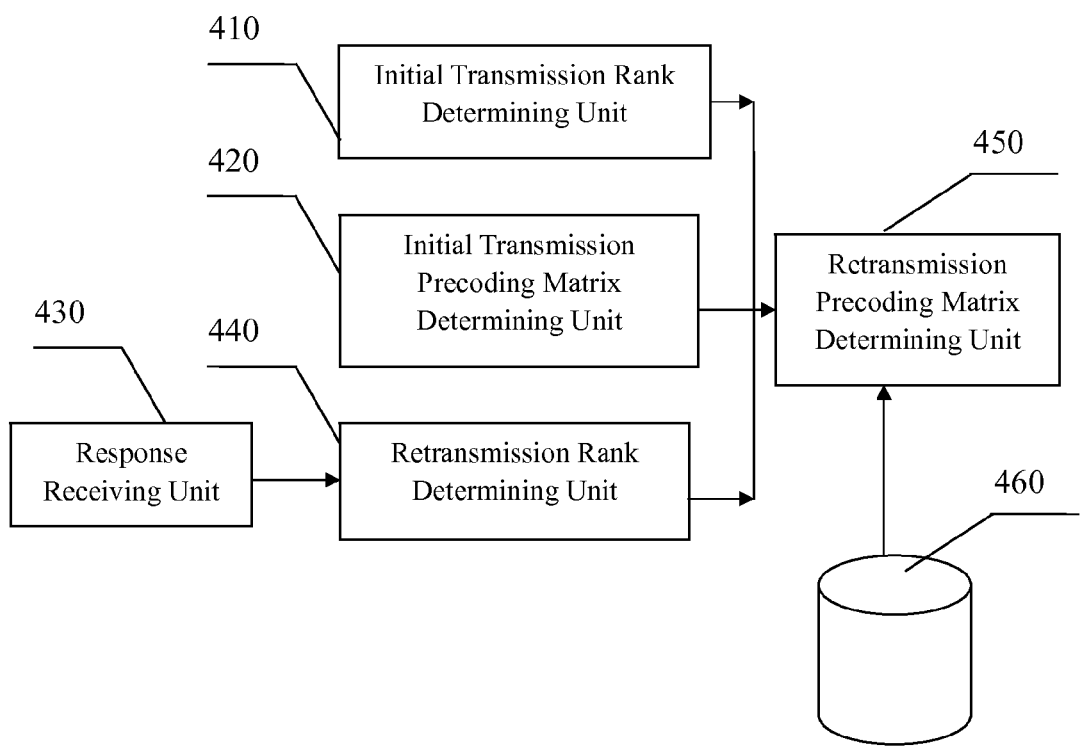
FIG. 4 illustrates a functional block diagram of an electronic apparatus according to an embodiment of the present invention.

FIG. 4 illustrates a functional block diagram of an electronic apparatus according to an embodiment of the present invention. As illustrated in FIG. 4, the electronic apparatus (e.g., the mobile phone 10 in FIG. 3) includes: an initial transmission rank determining unit 410 for determining an initial transmission rank; an initial transmission precoding matrix determining unit 420 for determining an initial transmission precoding matrix used in the transmission of an initial transmission content; a response receiving unit 430 for receiving a confirmation for the initial transmission content from a communication counterparty (for example, a BS) that communicates with the electronic apparatus; a retransmission rank determining unit 440 for determining whether a retransmission is necessary according to the confirmation, and determining a retransmission rank when it is determined that the retransmission is necessary; and a retransmission precoding matrix determining unit 450 for determining a retransmission precoding matrix according to the initial transmission precoding matrix determined by the initial transmission precoding matrix determining unit and the retransmission rank determined by the retransmission rank determining unit 440, when the retransmission rank is less than the initial transmission rank. In one embodiment, the retransmission precoding matrix determining unit 450 determines an index of the retransmission precoding matrix through a table look-up in a database 460 using an index of the initial transmission precoding matrix, the initial transmission rank and the retransmission rank, and then determines the retransmission precoding matrix. Further, the retransmission precoding matrix determining unit 450 includes a comparator for comparing the initial transmission rank with the retransmission rank. Since the implementation of the comparison is obvious for a person skilled in the art, it is not described in details herein, and also not illustrated independently in the flowcharts or the block diagrams.

FIG. 4 only illustrates a functional block diagram of a structure related to the embodiment of the present invention. A person skilled in the art shall appreciate that the electronic apparatus (portable mobile phone) will further include various circuits required to realize the functions of the electronic apparatus, such as power circuit, microphone circuit, speaker circuit, decoding unit and transmitting unit (e.g., transmitting the initial transmission content and the retransmission content). The database may be realized in various storage devices, such as ROM, flash memory and hard disk. The storage device may be a dedicated device, or a common storage device in the electronic apparatus. When the database is stored in the common storage device, it may be stored in a dedicated region of the storage device.

The initial transmission rank determining unit 410 may determine the initial transmission rank in various methods known to a person skilled in the art. The initial transmission precoding matrix determining unit 420 may determine the initial transmission precoding matrix used in the transmission of the initial transmission content, in various methods known to a person skilled in the art, for example, according to an instruction received from the communication counterparty (e.g., base station), or according to an estimation of the communication channel. The retransmission rank determining unit 440 may determine whether a retransmission is necessary and a retransmission rank when the retransmission is necessary, according to the fact whether NACK exists in a reception feedback (response) from the communication counterparty and the TB under NACK if it exists.

Figure 5:
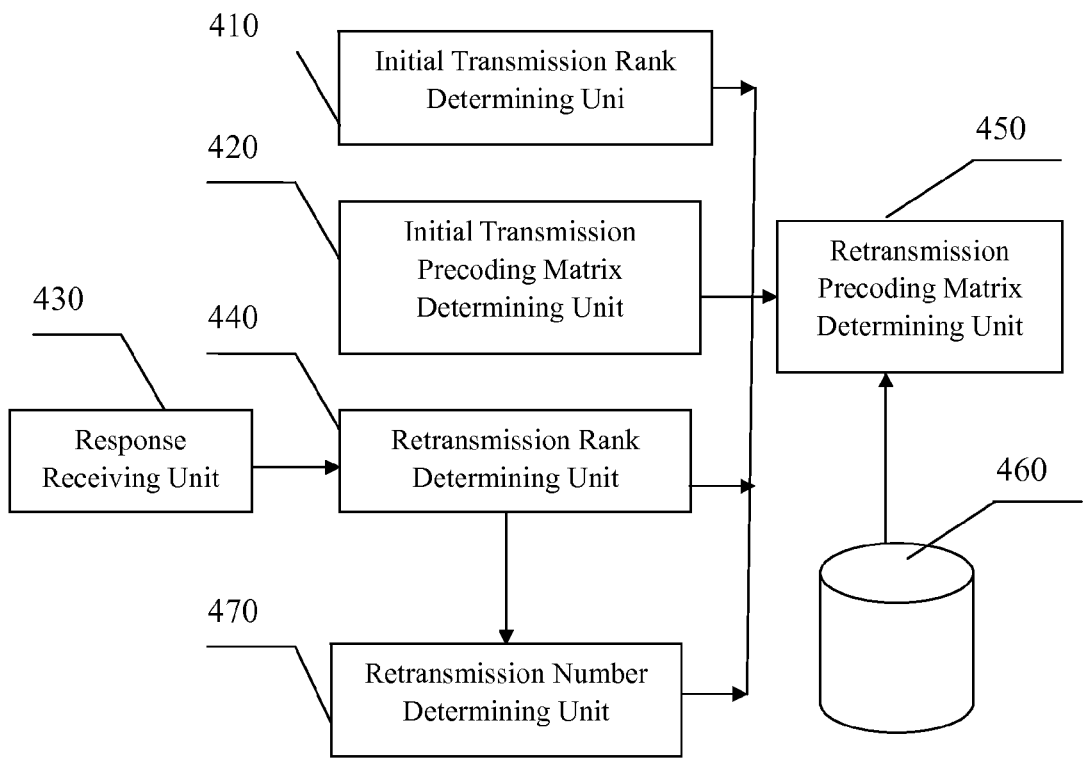
FIG. 5 illustrates a functional block diagram of an electronic apparatus according to another embodiment of the present invention.

The database 460 may store code books, which for example may be those shown in Tables 1 to 4. In addition, in one embodiment according to the present invention, the database further stores a table which stores the initial transmission precoding matrix, the initial transmission rank, the retransmission rank and the retransmission precoding matrix in association. FIG. 5 illustrates an example of such table.

TABLE 5

| Initial Transmission Rank | Initial Transmission Precoding Matrix Index | Retransmission Rank | Retransmission Precoding Matrix Index |
|---|---|---|---|
| 4 | 0 | 2 | 0 |
| 3 | 0 | 1 | 0 |
| 3 | 1 | 1 | 4 |
| 3 | 2 | 1 | 8 |
| 3 | 3 | 1 | 11 |
| — | — | — | — |
| 3 | 0 | 2 | 0 |
| 3 | 1 | 2 | 8 |
| 3 | 2 | 2 | 4 |
| — | — | — | — |
| 2 | 0 | 1 | 0 |
| 2 | 1 | 1 | 3 |
| 2 | 2 | 1 | 12 |
| — | — | — | — |

To be noted, in the above Table 5, the initial transmission precoding matrix index is the index of a precoding matrix in a code book corresponding to the initial transmission rank, and the retransmission precoding matrix index is the index of a precoding matrix in a code book corresponding to the retransmission rank.

Further to be noted, although the above Table 5 stores the initial transmission precoding matrix index and the retransmission precoding matrix index, it may store the initial transmission precoding matrix and the retransmission precoding matrix per se. But obviously, it is preferable to store the initial transmission precoding matrix index and the retransmission precoding matrix index, so as to save the memory space. Whether they store the precoding matrix per se or the precoding matrix index, Table 5 and the tables to be described later are tables used to determine the retransmission precoding matrix according to the initial transmission precoding matrix, the initial transmission rank and the retransmission rank.

Still to be noted, the retransmission precoding matrixes corresponding to the initial transmission precoding matrixes listed in the above table are just exemplary rather than limitations to the present invention. Although the highest initial transmission rank illustrated in the above table is 4, it may be a higher value such as 8, which can be determined according to the practical condition. In a word, the above table is just exemplary rather than a limitation to the embodiment of the present invention.

Yet to be noted, although various conditions are listed using one table as described above, multiple tables may be used. For example, the above table may be divided into multiple tables based on different initial transmission ranks and retransmission ranks.

In one embodiment, if the initial transmission precoding matrix is a non-identity matrix, the retransmission precoding matrix is a matrix in a code book corresponding to the retransmission rank, which has the maximum similarity with the initial transmission precoding matrix in the spatial direction (i.e., the retransmission precoding matrix is determined in a rule of spatial direction maximum similarity). In one embodiment, the rule of spatial direction maximum similarity may be a rule of minimum chordal distance, and the retransmission precoding matrix is determined by taking the minimum chordal distance as the metric. i.e.

$$P_{re,i} = \arg_{P_{re,i}}\{\min(\|P_{initial,i} * P^H_{initial,i} - P_{re,i} * P^H_{re,i}\|_F / \sqrt{2})\} \quad (1)$$

wherein $P_{initial,\ i}$ denotes a precoding matrix used in the initial transmission, which has an index number of i; $P_{re,\ i}$ denotes a precoding matrix used in the retransmission, which is one-by-one corresponding to the precoding matrix having an initial transmission index of i; $P^H$ means performing a conjugate transposing of matrix P; $\|\ \|_F$ means calculating a Frobenius norm; min( ) means calculating a minimum value; and arg{min} means selecting the $P_{re,\ i}$ to meet the minimum value.

Other rules may also be adopted to determine the matrix in the code book corresponding to the retransmission rank, which has the maximum similarity with the initial transmission precoding matrix in the spatial direction. For example, the projection distance, the fubini-stud distance, the maximum likelihood distance, etc. are often used to measure the matrix similarity. In a case where a plurality of precoding matrixes have the same similarity with the initial transmission precoding matrix, one of them may be determined randomly or according to the decided rule. The rule for example may be an index minimum rule (i.e., using a precoding matrix having the minimum index) or an index maximum rule (i.e., using a precoding matrix having the maximum index).

In the above embodiment, the electronic apparatus (e.g., mobile phone) and the communication counterparty (e.g., base station) both prestore tables which determine the retransmission precoding matrix according to the retransmission rank, the initial transmission rank and the initial transmission precoding matrix, thereby avoiding a communication that notifies the determined retransmission precoding matrix. In another embodiment, the electronic apparatus (e.g., mobile phone) and the communication counterparty (e.g., base station) both determine the retransmission precoding matrix by performing a calculation according to the retransmission rank, the initial transmission rank and the initial transmission precoding matrix (e.g., using the rule of spatial direction maximum similarity, and coordinating with a rule of minimum index or a rule of maximum index when necessary), thereby reducing the memory space at the cost of increasing the calculation loads of the electronic apparatus and the communication counterparty.

Although as illustrated in FIG. 4, the retransmission precoding matrix determining unit 450 determines the retransmission precoding matrix through a table look-up according to the initial transmission precoding matrix index, the initial transmission rank and the retransmission rank, it may also determine the retransmission precoding matrix by performing a calculation according to the initial transmission precoding matrix index, the initial transmission rank and the retransmission rank.

FIG. 5 illustrates a functional block diagram of an electronic apparatus according to another embodiment of the present invention. As illustrated in FIG. 5, the electronic apparatus (e.g., mobile phone 10 as illustrated in FIG. 3) according to the embodiment of the present invention may further include a retransmission number determining unit 470, in addition to the initial transmission rank determining unit 410, the initial transmission precoding matrix determining unit 420, the response receiving unit 430 and the retransmission rank determining unit 440 as illustrated in FIG. 4. The retransmission number determining unit 470 is configured to determine a retransmission number of the retransmission to be carried out, and it for example may be implemented by a counter. The retransmission precoding matrix determining unit 450 determines the retransmission precoding matrix according to the initial transmission precoding matrix determined by the initial transmission precoding matrix determining unit, the initial transmission rank determined by the initial transmission rank determining unit, the retransmission rank and the retransmission number. In one embodiment, the retransmission precoding matrix determining unit 450 determines the retransmission precoding matrix index through a table look-up in the database 460 using the initial transmission precoding matrix index, the initial transmission rank, the retransmission rank and the retransmission number, thereby determining the retransmission precoding matrix.

According to one embodiment of the present invention, when the retransmission precoding matrix is determined according to the initial transmission precoding matrix index, the initial transmission rank, the retransmission rank and the retransmission number, in a case where the initial transmission precoding matrix is a non-identity matrix, firstly as introduced as above, the retransmission precoding matrix is determined, regardless of the retransmission number, as a matrix in a code book corresponding to the retransmission rank, which has the maximum similarity with the initial transmission precoding matrix in the spatial direction (i.e., the retransmission precoding matrix is determined in a rule of spatial direction maximum similarity). Similarly, the rule of spatial direction maximum similarity may be a rule of minimum chordal distance. Then the precoding matrix corresponding to the retransmission number is determined in a rule of spatial direction minimum similarity. That is, a plurality of precoding matrixes having the minimum similarity with each other in the spatial direction are selected from the matrixes in the code book corresponding to the retransmission rank determined in the previous step, which have the maximum similarity with the initial transmission precoding matrix in the spatial direction, and then the selected precoding matrixes are used orderly in multiple retransmissions. In this step, firstly a combination of precoding matrixes perpendicular to each other may be selected, secondly another combination of precoding matrixes perpendicular to each other having a maximum chordal distance to the above combination of precoding matrixes may be selected, and then the selected precoding matrixes are orderly used in multiple retransmissions.

For example, assuming that a set of precoding matrixes having the same maximum similarity with the initial transmission precoding matrix is A={$P_{re,\ i1}, P_{re,\ i2}, \ldots, P_{re,\ in}$}. The adopted rule of spatial direction minimum similarity for example may be the rule of maximum chordal distance, i.e., selecting matrixes having a maximum chordal distance to each other from the set A.

$$\{P'_{re,i}, P_{re,i'}\} = \arg_{P_{re,i}, P_{re,i'}} \{\max(\|P_{re,i'} * P^H_{re,i} - P_{re,i} * P^H_{re,i}\|_F / \sqrt{2})\}, \quad (2)$$

$$P_{re,i'}, P_{re,i} \in A, i \neq i'$$

wherein $P_{re,\ i}$ and $P_{re,\ i'}$ are retransmission precoding matrixes not equal to each other, and max( ) means calculating a maximum value.

In a case where the initial transmission precoding matrix is an identity matrix, according to the retransmission rank, a plurality of precoding matrixes having the minimum similarity with each other in the spatial direction are selected from the code book corresponding to the retransmission rank, and then orderly used in multiple retransmissions.

In an alternative embodiment, when the retransmission precoding matrix is determined according to the initial transmission precoding matrix index, the initial transmission rank, the retransmission rank and the retransmission number, in a case where the initial transmission precoding matrix is a non-identity matrix, firstly as introduced as above, the retransmission precoding matrix is determined, regardless of the retransmission number, as a matrix in a code book corresponding to the retransmission rank, which has the maximum similarity with the initial transmission precoding matrix in the spatial direction (i.e., the retransmission precoding matrix is determined in a rule of spatial direction maximum similarity). Similarly, the rule of spatial direction maximum similarity may be a rule of minimum chordal distance. Then a matrix having the secondary maximum similarity with the initial transmission precoding matrix in the spatial direction is selected as a second retransmission precoding matrix. Next, a matrix having the tertiary maximum similarity with the initial transmission precoding matrix in the spatial direction is selected as a third retransmission precoding matrix, and so on. That is, the similarity between each retransmission precoding matrix and the initial transmission precoding matrix in the spatial direction progressively decreases.

Table 6 illustrates a table according to an embodiment of the present invention, for selecting a retransmission precoding matrix when the initial transmission rank=4 and the retransmission rank=2. In the LTE system, the uplink retransmission number is configured by the base station and notified to the user terminal. The maximum transmission number (retransmission number−1) may be any value selected from {1,2,3,4,5,6,7,8,10,12,16,20,24,28}, and the defaults value is 5. In the table, for example the maximum transmission number is 16, i.e., the maximum retransmission number is 15. When the configured maximum retransmission number is less than 15, items in the table may be used orderly; and when the configured maximum retransmission number is larger than 15, items in the table may be used circularly from the start position. In the table, combinations having the precoding matrix indexes of (0, 5), (1, 4), (2, 7), (3, 6), (8, 11), (9, 10), (12, 15), (13, 14) are pairwise orthogonal to each other and they have a minimum chordal distance therebetween, i.e., a minimum chordal distance exists between the precoding matrix having an index of 5 and the precoding matrix having an index of 1. The table is just an example satisfying the design rule of the present invention, and the specific selection result of the precoding matrix may be different from the table.

Table 7 illustrates a table for selecting a retransmission precoding matrix when the initial transmission rank=3 and the retransmission rank=1. In the table, for example the default transmission number=3, i.e., the maximum retransmission number=2. When the retransmission number >2, the precoding matrixes are circularly repeated, e.g., the precoding matrix used for the third retransmission is the same as that used for the first retransmission. In the table, in correspondence to the initial transmission precoding matrix index i, the two retransmitted precoding matrixes have the same and minimum chordal distance to the initial transmission precoding matrix index i, and the two precoding matrixes of the first and second retransmissions are orthogonal to each other.

Table 8 illustrates a table for selecting a retransmission precoding matrix when the initial transmission rank=3 and the retransmission rank=2. In the table, for example the transmission number=5, i.e., the maximum retransmission number=4. When the retransmission number >4, the precoding matrixes are circularly repeated, e.g., the precoding matrix used for the fifth retransmission is the same as that used for the first retransmission.

Table 9 illustrates a table for selecting a retransmission precoding matrix when the initial transmission rank=2 and the retransmission rank=1. In the table, for example the transmission number=5, i.e., the maximum retransmission number=4. When the retransmission number >4, the precoding matrixes are circularly repeated, e.g., the precoding matrix used for the fifth retransmission is the same as that used for the first retransmission.

Table 10 illustrates a table for selecting a retransmission precoding matrix when the initial transmission rank=3 and the retransmission rank=2. In the embodiment, a rule of spatial direction similarity progressively decreasing (the spatial direction similarity for example may be measured using the chordal distance) is adopted for the determination. As can be seen from Tables 2-3, there are three different chordal distances for a certain initial transmission precoding matrix, wherein $d_1<d_2<d_3$. That is, the retransmission precoding matrix and the initial transmission precoding matrix have three different spatial similarities, and the precoding matrixes corresponding to the three different chordal distances may be classified into three sets A1, A2 and A3. To be noted, the sets A1, A2 and A3 vary with different initial transmission precoding matrixes, but how to determine the three sets is known in the art. In the embodiment, for example the transmission number=4, i.e., the maximum retransmission number=3. Regarding the three retransmissions, a precoding matrix is selected for the first retransmission from the set A1 of precoding matrixes having a chordal distance=d1, a precoding matrix is selected for the second retransmission from the set A2 of precoding matrixes having a chordal distance=d2, and a precoding matrix is selected for the third retransmission from the set A3 of precoding matrixes having a chordal distance=d3. When the sets A1, A2 and A3 contain a plurality of precoding matrixes, one of the precoding matrixes may be determined randomly or according to the decided rule (e.g., a precoding matrix having the minimum PMI). When the retransmission number >3, the precoding matrixes are circularly repeated, e.g., the precoding matrix used for the fourth retransmission is the same as that used for the first retransmission, or precoding matrixes different from those used for the first to third retransmissions may be orderly selected from the sets A1, A2 and A3. In an alternative embodiment, the number of sets obtained by dividing the code book corresponding to the retransmission rank may be determined according to the maximum retransmission number. A circular repetition may be carried out as described above when the number of the sets is less than the maximum retransmission number.

TABLE 6

| Initial Transmission Precoding Matrix Index | Retransmission Number | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 0 | 0 | 5 | 1 | 4 | 2 | 7 | 3 | 6 | 8 | 11 | 9 | 10 | 12 | 15 | 13 |

TABLE 7

| Initial Transmission Precoding Matrix Index | Retransmission Number | |
|---|---|---|
| | 1 | 2 |
| 0 | 0 | 1 |
| 1 | 4 | 5 |
| 2 | 8 | 9 |
| 3 | 11 | 10 |
| 4 | 12 | 13 |
| 5 | 15 | 14 |
| 6 | 14 | 12 |
| 7 | 13 | 15 |
| 8 | 10 | 8 |
| 9 | 9 | 11 |
| 10 | 2 | 6 |
| 11 | 3 | 7 |

TABLE 8

| Initial Transmission Precoding Matrix Index | Retransmission Number | | | |
|---|---|---|---|---|
| | 1 | 2 | 3 | 4 |
| 0 | 0 | 2 | 1 | 3 |
| 1 | 8 | 10 | 9 | 11 |
| 2 | 4 | 12 | 0 | 8 |
| 3 | 2 | 10 | 6 | 14 |
| 4 | 5 | 15 | 8 | 2 |
| 5 | 7 | 13 | 10 | 0 |
| 6 | 10 | 0 | 15 | 5 |
| 7 | 13 | 7 | 2 | 8 |
| 8 | 12 | 4 | 10 | 2 |
| 9 | 6 | 14 | 0 | 8 |
| 10 | 1 | 8 | 3 | 10 |
| 11 | 11 | 2 | 9 | 0 |

TABLE 9

| Initial Transmission Precoding Matrix Index | Retransmission Number | | | |
|---|---|---|---|---|
| | 1 | 2 | 3 | 4 |
| 0 | 0 | 2 | 1 | 3 |
| 1 | 3 | 1 | 0 | 2 |
| 2 | 12 | 14 | 13 | 15 |
| 3 | 13 | 15 | 12 | 14 |
| 4 | 8 | 10 | 9 | 11 |
| 5 | 9 | 11 | 8 | 10 |
| 6 | 4 | 6 | 5 | 7 |
| 7 | 7 | 5 | 4 | 6 |
| 8 | 0 | 8 | 4 | 12 |
| 9 | 4 | 12 | 0 | 8 |
| 10 | 2 | 10 | 6 | 14 |
| 11 | 6 | 14 | 2 | 10 |
| 12 | 2 | 8 | 5 | 15 |
| 13 | 5 | 15 | 2 | 8 |
| 14 | 10 | 0 | 7 | 13 |
| 15 | 7 | 13 | 0 | 10 |

TABLE 10

| Initial Transmission Precoding Matrix Index | Retransmission Number | | |
|---|---|---|---|
| | 1 | 2 | 3 |
| 0 | 0 | 2 | 4 |
| 1 | 5 | 6 | 1 |
| 2 | 8 | 7 | 10 |
| 3 | 10 | 9 | 3 |
| 4 | 12 | 15 | 0 |
| 5 | 15 | 1 | 12 |
| 6 | 12 | 10 | 13 |
| 7 | 13 | 7 | 14 |
| 8 | 10 | 4 | 9 |
| 9 | 9 | 14 | 8 |
| 10 | 2 | 8 | 3 |
| 11 | 3 | 11 | 2 |

To be noted, although the above tables are illustrated separately, they can be combined into one table. In addition, the tables may store the precoding matrixes per se rather than the precoding matrix indexes.

Figure 6:
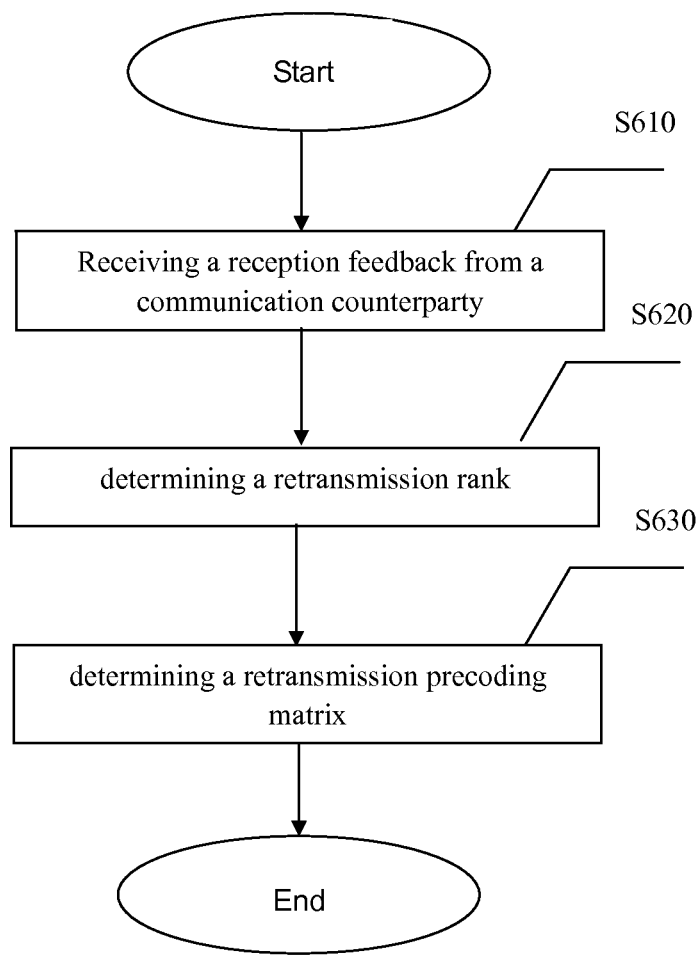
FIG. 6 illustrates a flowchart of a processing at a mobile terminal according to an embodiment of the present invention.

FIG. 6 illustrates a flowchart of a processing at a mobile terminal according to an embodiment of the present invention. As illustrated in FIG. 6, firstly in step S610, a reception feedback from the communication counterparty (e.g., base station) is received. Next in step S620, a retransmission rank is determined according to the reception feedback. Finally in step S630, a retransmission precoding matrix is determined according to the initial transmission rank, the retransmission rank and the initial precoding matrix. In another embodiment, in step S630, the retransmission precoding matrix is determined according to the initial transmission rank, the retransmission rank, the initial precoding matrix and the retransmission number.

In one embodiment, the retransmission precoding matrix determining unit 450 determines the retransmission precoding matrix through a table look-up using the initial transmission precoding matrix index, the initial transmission rank and the retransmission rank (further according to the retransmission number in some embodiments).

In one embodiment, the retransmission precoding matrix determining unit 450 determines the retransmission precoding matrix through a calculation using the initial transmission precoding matrix index, the initial transmission rank and the retransmission rank (further according to the retransmission number in some embodiments).

Figure 7A:
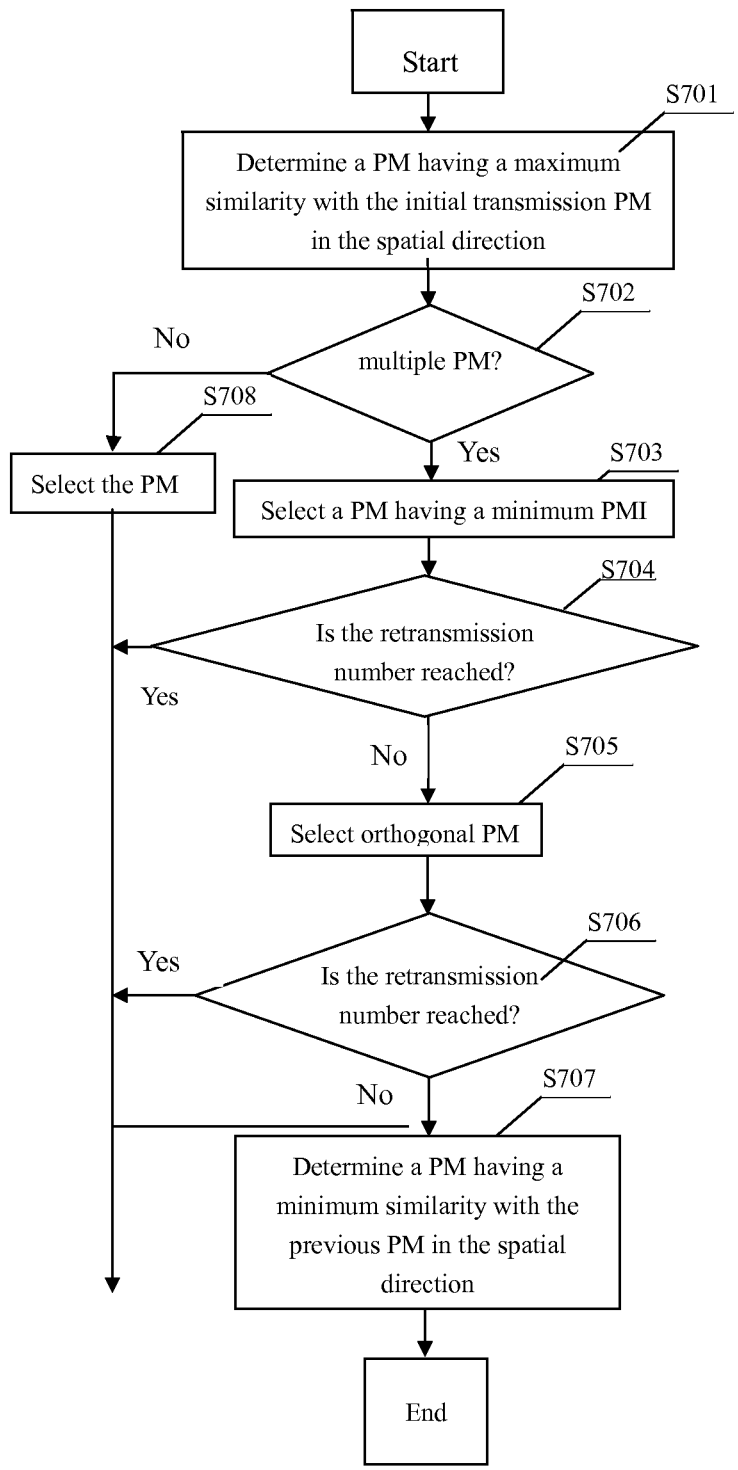
FIG. 7A illustrates a flowchart of a processing of determining a retransmission precoding matrix by performing a calculation.

FIG. 7A illustrates a flowchart of a processing of determining a retransmission precoding matrix by performing a calculation by the retransmission precoding matrix determining unit 450.

As illustrated in FIG. 7A, for example firstly in step S701, a precoding matrix in a code book corresponding to the retransmission rank, which has a maximum similarity with the initial transmission precoding matrix in the spatial direction, is determined. Next in step S702, whether there are multiple such matrixes is judged, and if there are (step S702, Yes), in step S703, a precoding matrix PM having a maximum or minimum index (PMI) (in the drawing the precoding matrix having a minimum PMI is selected) is selected as a precoding matrix corresponding to the first retransmission (i.e., a first retransmission precoding matrix). Next, whether the retransmission number is reached is determined in step S704, and if it is not reached (S704, No), in step S705, a precoding matrix orthogonal to the first retransmission precoding matrix is selected from the precoding matrixes determined in step S701; if such precoding matrix is not existed, the process directly enters into step S707, and if such precoding matrix is existed, the precoding matrix is determined as a second retransmission precoding matrix. Next in step S706, whether the retransmission number is reached is determined, and if it is not reached (S706, No), in step S707, a precoding matrix having a minimum similarity with the second retransmission precoding matrix in the spatial direction is selected, then the process returns to step S702 to repeat the above steps until a precoding matrix corresponding to the retransmission number is determined. In step S702, if there is only one such precoding matrix, the precoding matrix is selected (S708) and the process ends. Further, in steps S704 and S706, if it is judged that the retransmission number is reached, the process ends.

Figure 7B:
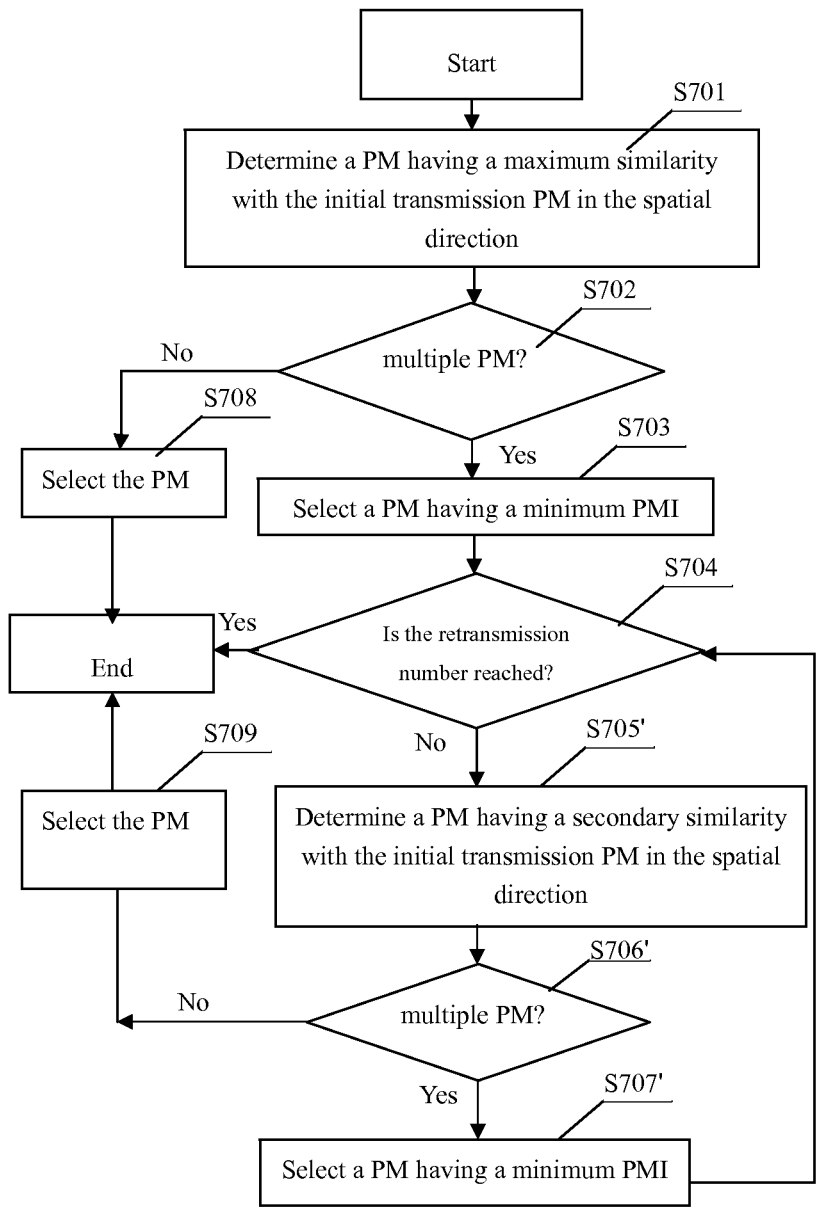
FIG. 7B illustrates a flowchart of a processing of determining a retransmission precoding matrix by performing a calculation.

FIG. 7B illustrates a flowchart of another processing of determining a retransmission precoding matrix by performing a calculation by the retransmission precoding matrix determining unit 450.

As illustrated in FIG. 7B, for example firstly in step S701, a precoding matrix in a code book corresponding to the retransmission rank, which has a maximum similarity with the initial transmission precoding matrix in the spatial direction, is determined. Next in step S702, it is judged whether there are multiple such matrixes, and if there are (step S702, Yes), in step S703, a precoding matrix PM having a maximum or minimum index (PMI) is selected (in the drawing the precoding matrix having a minimum PMI is selected) as a precoding matrix corresponding to the first retransmission (i.e., a first retransmission precoding matrix). Next, it is determined whether the retransmission number is reached in step S704, and if it is not reached (S704, No), in step S705', a precoding matrix having a secondary similarity with the initial transmission precoding matrix in the spatial direction is selected from the code book corresponding to the retransmission rank. Next in step S706', whether there are multiple such precoding matrixes is determined, and if there are (step S706', Yes), a precoding matrix having a minimum PMI is selected in step S707', then the process returns to step S704 to repeat the above steps until a precoding matrix corresponding to the retransmission number is determined. In steps S702 and S706', if there is only one such precoding matrix, this precoding matrix is selected (S708) and the process ends. Further, in steps S704, if it is judged that the retransmission number is reached, the process ends.

A person skilled in the art will easily conceive of changing the flowchart of FIG. 7B, so as to reselect precoding matrixes in the former order when there is no precoding matrix having a worse similarity with the initial transmission precoding matrix in the spatial direction. In that case, in the preferred embodiment, precoding matrixes having different index numbers will be selected when precoding matrixes having the same similarity with the initial transmission precoding matrix in the spatial direction are to be reselected.

Further, in an exemplary embodiment of the present invention, the precoding matrix having the maximum similarity with the initial transmission precoding matrix in the spatial direction is always selected when the first retransmission is carried out. Regarding the subsequent retransmissions, for example, a precoding matrix which has a different index but the same similarity with the initial transmission precoding matrix in the spatial direction as the first retransmission precoding matrix may be selected. Further, for example, the matrixes selected for respective retransmissions shall be orthogonal to each other or have a maximum chordal distance. In an alternative embodiment, the similarity between the selected precoding matrix and the initial transmission precoding matrix decreases with the increment of the retransmission number.

Figure 8:
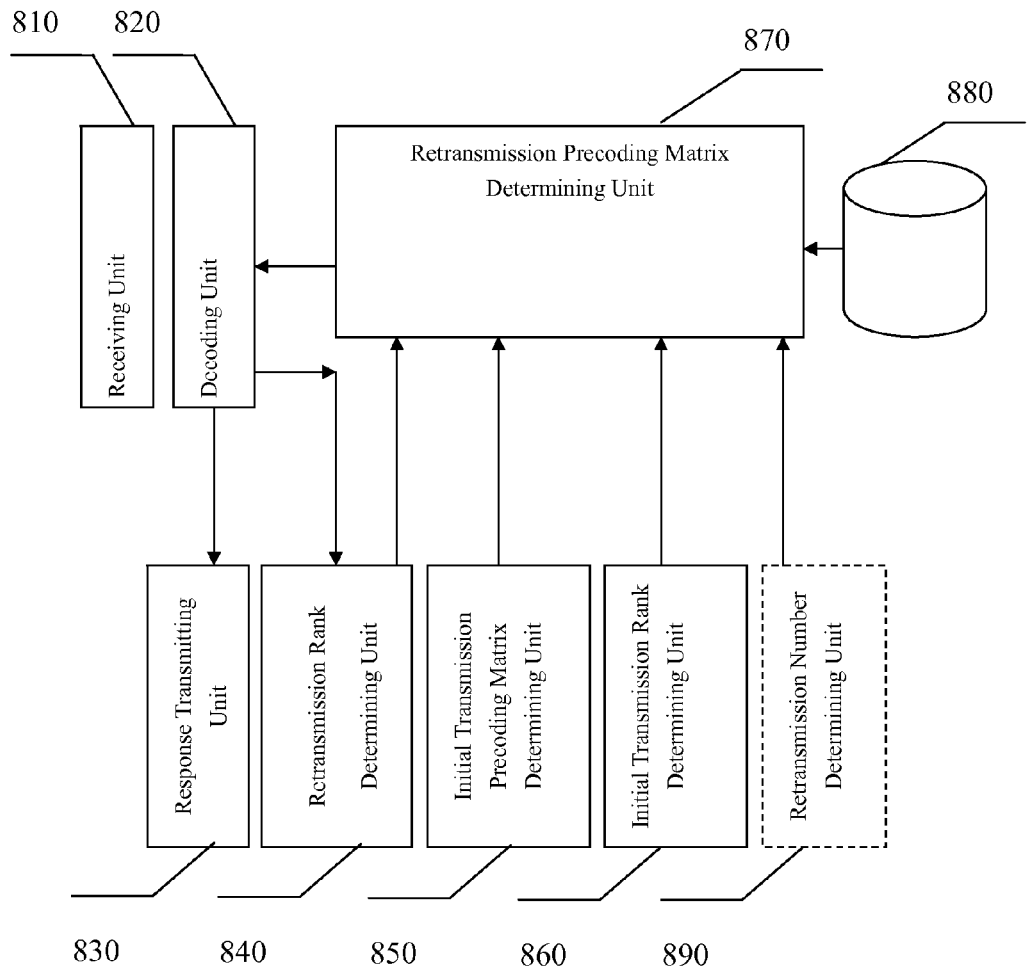
FIG. 8 illustrates a functional block diagram of a base station according to another embodiment of the present invention.

FIG. 8 illustrates a functional block diagram of a base station according to another embodiment of the present invention. The base station is an example of an electronic apparatus according to an embodiment of the present invention. As illustrated in FIG. 8, the electronic apparatus (e.g., base station) according to the present invention includes: a receiving unit 810 for receiving initial transmission data and retransmission data transmitted from the communication counterparty (e.g., the mobile phone as illustrated in FIG. 3); a decoding unit 820 for decoding the data received by the receiving unit; a response transmitting unit 830 for determining a response (reception feedback) to be transmitted according to a decoding result; a retransmission rank determining unit 840 for determining a retransmission rank according to the decoding result; an initial transmission rank determining unit 860 for determining an initial transmission rank for an initial transmission performed by the communication counterparty (e.g., the mobile phone as illustrated in FIG. 3); an initial transmission precoding matrix determining unit 850 for determining an initial transmission precoding matrix used in a transmission of an initial content performed by the communication counterparty; and a retransmission precoding matrix determining unit 870 for determining a retransmission precoding matrix according to the initial transmission precoding matrix determined by the initial transmission precoding matrix determining unit, initial transmission rank determined by the initial transmission rank determining unit, and the retransmission rank.

In one embodiment, the retransmission precoding matrix determining unit 870 determines the retransmission precoding matrix index through a table look-up in the database 880 using the initial transmission precoding matrix index, the initial transmission rank and the retransmission rank, thereby determining the retransmission precoding matrix.

FIG. 8 only illustrates a functional block diagram of a structure related to the embodiment of the present invention. A person skilled in the art shall appreciate that the electronic apparatus will further include various circuits required to realize the functions of the base station, such as power circuit, wired or wireless interface with other base station, antenna circuit, etc. The database may be realized in various storage devices, such as ROM, flash memory and hard disk. The storage device may be a dedicated device, or a common storage device in the electronic apparatus. When the database is stored in the common storage device, it may be stored in a dedicated region of the storage device.

The initial transmission rank determining unit 860 may determine the initial transmission rank in various methods known to a person skilled in the art. The initial transmission precoding matrix determining unit 850 may determine the initial transmission precoding matrix used in the transmission of the initial transmission content performed by the communication counterparty in various methods known to a person skilled in the art. For example, the base station may determine the initial transmission rank and the initial transmission precoding matrix according to the conditions of the channel with the communication terminal, and transmit the index of the determined initial transmission precoding matrix and the initial transmission rank to the communication counterparty. Alternatively, the determination may be made according to an instruction received from the communication counterparty (e.g., the communication terminal as illustrated in FIG. 3).

The database 880 may store code books, which for example may be those shown in Tables 1 to 4. In addition, in one embodiment according to the present invention, the database further stores a table which stores the initial transmission precoding matrix, the initial transmission rank, the retransmission rank and the retransmission precoding matrix in association. FIG. 5 illustrates an example of such table. Further, in another embodiment of the present invention, the database further stores a table which stores the initial transmission precoding matrix, the initial transmission rank, the retransmission rank, the retransmission number and the retransmission precoding matrix in association. FIGS. 6-9 illustrate examples of such table. In the preferred embodiment, the content stored in the database at the base station is the same as that stored in the database at the communication counterparty.

Figure 9:
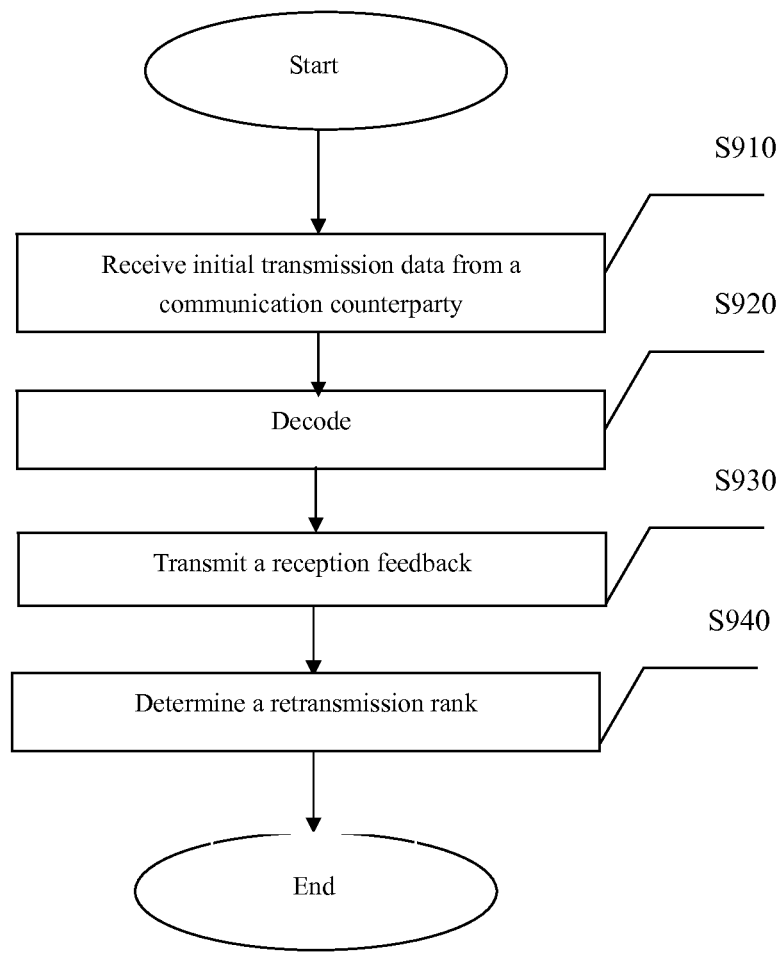
FIG. 9 illustrates a processing by a base station upon reception of initial transmission data.

FIG. 9 illustrates a processing by a base station upon reception of initial transmission data. Firstly in step S910, the receiving unit 810 receives initial transmission data from the communication counterparty. Next in step S920, the decoding unit 820 decodes the data received by the receiving unit 810 according to the initial precoding matrix determined by the initial transmission precoding matrix determining unit 850. In step S930, the response transmitting unit 830 sends a reception feedback according to a decoding result of the decoding unit 820. In step S940, the retransmission rank determining unit 840 determines the retransmission rank for a retransmission performed by the communication counterparty according to the decoding result of the decoding unit.

Figure 10:
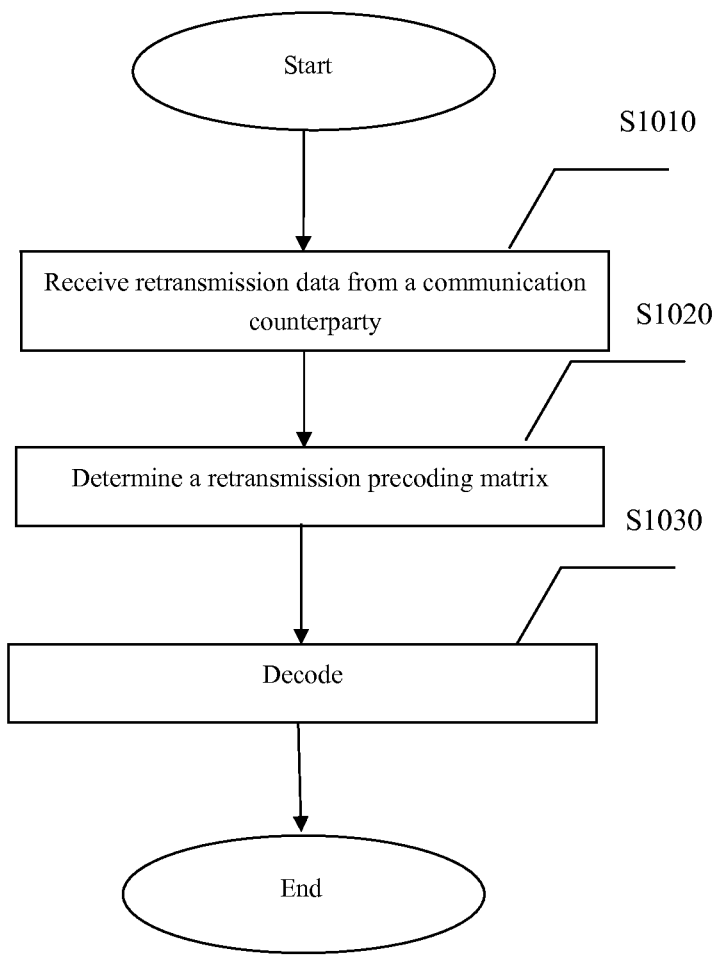
FIG. 10 illustrates a processing by a base station upon reception of retransmission data.

FIG. 10 illustrates a processing by a base station upon reception of retransmission data. In step S1010, the receiving unit 810 receives retransmission data from a communication counterparty. In step S1020, the retransmission precoding matrix determining unit 870 determines a retransmission precoding matrix according to the retransmission rank determined by the retransmission rank determining unit 840, the initial transmission precoding matrix determined by the initial transmission rank determining unit 860, and the initial rank determined by the initial rank determining unit. In step S1030, the decoding unit 820 decodes the data received by the receiving unit 810 according to the retransmission precoding matrix determined by the retransmission precoding matrix determining unit 870. In one embodiment, the base station may determine the retransmission precoding matrix through a table look-up according to the tables stored in the database 880. In an alternative embodiment, like the condition as described for the mobile terminal, the retransmission precoding matrix can also be obtained through a calculation. For example, a precoding matrix in a code book corresponding to the retransmission rank, which has the maximum similarity with the initial transmission precoding matrix in the spatial direction is firstly calculated, then whether there are multiple such matrixes is judged, and if there are, a precoding matrix having the maximum or minimum index is selected.

In a case where the calculation method used at the base station is consistent with that used at the mobile terminal, it is ensured that the precoding matrix obtained at the base station is the same as that obtained at the mobile terminal.

In another embodiment, for example as illustrated by the dotted box in FIG. 8, the base station further includes a retransmission number determining unit 890, which for example may be implemented by a counter. In this embodiment, the retransmission precoding matrix determining unit 870 determines the retransmission precoding matrix according to the initial transmission precoding matrix determined by the initial transmission precoding matrix determining unit, the initial transmission rank determined by the initial transmission rank determining unit, the retransmission rank and the retransmission number.

In one embodiment, the retransmission precoding matrix determining unit 870 determines the retransmission precoding matrix index through a table look-up in the database 880 using the initial transmission precoding matrix index, the initial transmission rank, the retransmission rank and the retransmission number, thereby determining the retransmission precoding matrix. To be noted, in this embodiment, the tables stored in the database 880 include the retransmission numbers, for example as illustrated in Tables 6 to 9.

In one embodiment, the retransmission precoding matrix determining unit 870 determines the retransmission precoding matrix through a calculation using the initial transmission precoding matrix index, the initial transmission rank, the retransmission rank and the retransmission number. In this embodiment, for example the base station performs the following steps: firstly calculating a precoding matrix in a code book corresponding to the retransmission rank, which has a maximum similarity with the initial transmission precoding matrix in the spatial direction; next, judging whether there are multiple such matrixes, and if so, selecting a precoding matrix having a maximum or minimum index as a precoding matrix corresponding to the first retransmission (i.e., a first retransmission precoding matrix); next, determining a precoding matrix orthogonal to the first retransmission precoding matrix and taking it as a second retransmission precoding matrix; next, selecting a precoding matrix having a minimum similarity with the second retransmission precoding matrix in the spatial direction; selecting a precoding matrix having a maximum or minimum index number if there are multiple such matrixes; repeating the steps to determine precoding matrixes corresponding to the retransmission numbers. In an alternative embodiment, the similarity between the retransmission precoding matrix and the initial transmission precoding matrix in the spatial direction decreases with the increment of the retransmission number. For the implementations of these embodiments, please refer to the flows as illustrates in FIGS. 7A and 7B and the above descriptions of the flows.

In a case where the calculation method used at the base station is consistent with that used at the mobile terminal, it is ensured that the precoding matrix obtained at the base station is the same as that obtained at the mobile terminal.

In the embodiments of the present invention, the retransmission precoding matrix has a non-zero weighted value in each antenna, so that the data in each transmitting antenna is effectively transmitted, thereby ensuring the high efficiency of the antenna transmission power.

The logic part (e.g., processor in a computer, field programmable logic part, etc.) usable or readable medium for example may be, but not limited to, an electronic, magnetic, optical, electromagnetic, or semiconductor system, apparatus or device. More specific examples (a nonexhaustive list) of the computer readable medium would include a portable computer disk, a random access memory (RAM), a read-only memory (ROM), an erasable programmable read-only memory (EPROM or Flash memory), and a portable optical medium and/or a magnetic medium such as flash disk or CD-ROM.

To be noted, in some alternative embodiments, the described functions/actions may occur in an order other than that shown in the flowchart. For example, according to the concerned functions/actions, two blocks consecutively shown actually can be performed concurrently or those blocks sometimes may be performed in a reverse order. In addition, the functions of a given block in the flowchart and/or block diagram may be separated into several blocks, and/or the functions of two or more blocks in the flowchart and/or block diagram may be at least partially integrated.

Although the present invention is described through the examples of the preferred embodiments, it shall be appreciated that various other modifications, changes and additions may be made within the spirit and the range of the present invention. Therefore, the accompanied claims intend to cover all those modifications, changes and additions falling within the range of the spirit and the range of the present invention.

The invention claimed is:

1. A method for determining a retransmission precoding matrix, comprising:
   determining an initial transmission rank;
   determining an initial transmission precoding matrix used in the transmission of an initial transmission content;
   receiving a confirmation for the initial transmission content from a communication counterparty;
   determining whether a retransmission is necessary according to the confirmation for the initial transmission content, and determining a retransmission rank when it is determined that the retransmission is necessary;
   determining a retransmission number of the retransmission to be carried out; and
   determining a retransmission precoding matrix according to the initial transmission precoding matrix, the retransmission rank, and the retransmission number, when the retransmission rank is less than the initial transmission rank.

2. The method according to claim 1, wherein each of the retransmission precoding matrixes is in a code book corresponding to the retransmission rank and has the maximum similarity in the spatial direction with the initial transmission precoding matrix.

3. The method according to claim 1, wherein each of the retransmission precoding matrixes is in a code book corresponding to the retransmission rank and has the maximum similarity in the spatial direction with the initial transmission precoding matrix; with respect to two precoding matrixes corresponding to adjacent retransmission numbers, the precoding matrix corresponding to the latter retransmission number is orthogonal to the precoding matrix corresponding to the former retransmission number, or the precoding matrix corresponding to the latter retransmission number has the minimum similarity in the spatial direction with the precoding matrix corresponding to the former retransmission number.

4. The method according to claim 1, wherein the similarity between the determined retransmission precoding matrix and the initial transmission precoding matrix in the spatial direction decreases with the increment of the retransmission numbers.

5. The method according to claim 1, wherein the process of determining the retransmission precoding matrix determines the retransmission precoding matrix through table look-up or calculation.

6. An electronic apparatus, comprising:
   an initial transmission rank determining unit for determining an initial transmission rank;
   an initial transmission precoding matrix determining unit for determining an initial transmission precoding matrix used in the transmission of an initial transmission content;
   a response receiving unit for receiving a confirmation for the initial transmission content from a communication counterparty that communicates with the electronic apparatus;
   a retransmission rank determining unit for determining whether a retransmission is necessary according to the confirmation, and determining a retransmission rank when it is determined that the retransmission is necessary;
   a retransmission number determining unit for determining a retransmission number of the retransmission to be carried out; and
   a retransmission precoding matrix determining unit for determining a retransmission precoding matrix according to the initial transmission precoding matrix determined by the initial transmission precoding matrix determining unit, the retransmission rank determined by the retransmission rank determining unit, and the retransmission number determined by the retransmission number determining unit, when the retransmission rank is less than the initial transmission rank.

7. The electronic apparatus according to claim 6, wherein each of the retransmission precoding matrixes is in a code book corresponding to the retransmission rank and has the maximum similarity in the spatial direction with the initial transmission precoding matrix.

8. The electronic apparatus according to claim 6, wherein each of the retransmission precoding matrixes is a precoding matrix in a code book corresponding to the retransmission rank and has the maximum similarity in the spatial direction with the initial transmission precoding matrix; with respect to two precoding matrixes corresponding to adjacent numbers of retransmissions, the precoding matrix corresponding to the latter retransmission number is orthogonal to the precoding matrix corresponding to the former retransmission number, or the precoding matrix corresponding to the latter retransmission number has the minimum similarity in the spatial direction with the precoding matrix corresponding to the former retransmission number.

9. The electronic apparatus according to claim 6, wherein the similarity in the spatial direction between the determined retransmission precoding matrix and the initial transmission precoding matrix decreases with the increment of the retransmission number.

10. The electronic apparatus according to claim 6, wherein the retransmission precoding matrix determining unit determines the retransmission precoding matrix through table look-up or calculation.

11. The electronic apparatus according to claim 6, wherein the initial transmission content is transmitted through two or more transmission blocks, and a negative confirmation for a part of the initial transmission content is the negative confirmation for a part of the two or more transmission blocks.

12. An electronic apparatus, comprising:
   an initial transmission rank determining unit for determining an initial transmission rank;
   an initial transmission precoding matrix determining unit for determining an initial transmission precoding matrix used in the transmission of an initial transmission content by a communication counterparty that communicates with the electronic apparatus;
   a decoding unit for decoding data received from the communication counterparty;
   a retransmission rank determining unit for determining whether a retransmission by the communication counterparty is necessary according to a decoding result of the decoding unit, and determining a retransmission rank when it is determined that the retransmission by the communication counterparty is necessary;
   a retransmission number determining unit for determining a retransmission number of the retransmission to be carried out; and
   a retransmission precoding matrix determining unit for determining the retransmission precoding matrix according to the initial transmission precoding matrix determined by the initial transmission precoding matrix determining unit, the retransmission rank, and the retransmission number, when the retransmission rank is less than the initial transmission rank.

13. The electronic apparatus according to claim 12, wherein each of the retransmission precoding matrixes is in a code book corresponding to the retransmission rank and has the maximum similarity in the spatial direction with the initial transmission precoding matrix.

14. The electronic apparatus according to claim 12, wherein each of the retransmission precoding matrixes is in a code book corresponding to the retransmission rank and has the maximum similarity in the spatial direction with the initial transmission precoding matrix; with respect to two precoding matrixes corresponding to adjacent numbers of retransmissions, the precoding matrix corresponding to the latter retransmission number is orthogonal to the precoding matrix corresponding to the former retransmission number, or the precoding matrix corresponding to the latter retransmission number has the minimum similarity in the spatial direction with the precoding matrix corresponding to the former retransmission number.

15. The electronic apparatus according to claim 12, wherein the similarity between the determined retransmission precoding matrix and the initial transmission precoding matrix in the spatial direction decreases with the increment of the retransmission number.

16. The electronic apparatus according to claim 12, wherein the retransmission precoding matrix determining unit determines the retransmission precoding matrix through table look-up or calculation.

17. A communication system, comprising:
a first electronic apparatus, that comprises:
an initial transmission rank determining unit for determining an initial transmission rank;
an initial transmission precoding matrix determining unit for determining an initial transmission precoding matrix used in the transmission of an initial transmission content;
a response receiving unit for receiving a confirmation for the initial transmission content from a communication counterparty that communicates with the electronic apparatus;
a retransmission rank determining unit for determining whether a retransmission is necessary according to the confirmation, and determining a retransmission rank when it is determined that the retransmission is necessary; and
a retransmission precoding matrix determining unit for determining a retransmission precoding matrix according to the initial transmission precoding matrix determined by the initial transmission precoding matrix determining unit and the retransmission rank determined by the retransmission rank determining unit, when the retransmission rank is less than the initial transmission rank; and
a second electronic apparatus that comprises:
an initial transmission rank determining unit for determining an initial transmission rank;
an initial transmission precoding matrix determining unit for determining an initial transmission precoding matrix used in the transmission of an initial transmission content by a communication counterparty that communicates with the electronic apparatus;
a decoding unit for decoding data received from the communication counterparty;
a retransmission rank determining unit for determining whether a retransmission by the communication counterparty is necessary according to a decoding result of the decoding unit, and determining a retransmission rank when it is determined that the retransmission by the communication counterparty is necessary; and
a retransmission precoding matrix determining unit for determining the retransmission precoding matrix according to the initial transmission precoding matrix determined by the initial transmission precoding matrix determining unit and the retransmission rank, when the retransmission rank is less than the initial transmission rank,
wherein the retransmission precoding matrix determining units of the first electronic apparatus and the second electronic apparatus use the same method to determine the retransmission precoding matrix.

18. A method for determining a retransmission precoding matrix, comprising:
determining an initial transmission rank;
determining an initial transmission precoding matrix used in the transmission of an initial transmission content by a communication counterparty;
decoding data received from the communication counterparty;
determining whether a retransmission by the communication counterparty is necessary according to a decoding result, and determining a retransmission rank when it is determined that the retransmission by the communication counterparty is necessary;
determining a retransmission number of the retransmission to be carried out; and
determining the retransmission precoding matrix according to the initial transmission precoding matrix, the retransmission rank, and the retransmission number, when the retransmission rank is less than the initial transmission rank.

19. The method according to claim 18, wherein each of the retransmission precoding matrixes is in a code book corresponding to the retransmission rank and has the maximum similarity in the spatial direction with the initial transmission precoding matrix.

20. The method according to claim 18, wherein each of the retransmission precoding matrixes is in a code book corresponding to the retransmission rank and has the maximum similarity in the spatial direction with the initial transmission precoding matrix; with respect to two precoding matrixes corresponding to adjacent numbers of retransmissions, the precoding matrix corresponding to the latter retransmission number is orthogonal to the precoding matrix corresponding to the former retransmission number, or the precoding matrix corresponding to the latter retransmission number has the minimum similarity in the spatial direction with the precoding matrix corresponding to the former retransmission number.

21. The method according to claim 18, wherein the similarity in the spatial direction between the determined retransmission precoding matrix and the initial transmission precoding matrix decreases with the increment of the retransmission number.

22. A non-transitory storage medium for storing a program executable on a logical part, that when executed enables the logical part to execute the method according to claim 1.

23. A non-transitory storage medium for storing a program executable on a logical part, that when executed enables the logical part to execute the method according to claim 18.

* * * * *